United States Patent [19]

Kunz et al.

[11] Patent Number: 4,675,500

[45] Date of Patent: Jun. 23, 1987

[54] LASER PROCESSING APPARATUS WITH MEANS FOR SELECTIVELY VARYING THE TRANSVERSE MODE DISTRIBUTION OF THE LASER BEAM

[75] Inventors: Rino E. Kunz, Steinmaur; Urs Murbach, Neuenhof; Ernst Huber, Wettingen, all of Switzerland

[73] Assignee: Gretag Aktiengesellschaft, Regensdorf, Switzerland

[21] Appl. No.: 665,998

[22] Filed: Oct. 29, 1984

[30] Foreign Application Priority Data

Oct. 28, 1983 [CH] Switzerland .................. 5848/83

[51] Int. Cl.⁴ ............................................ B23K 26/00
[52] U.S. Cl. ................... 219/121 LP; 372/103; 372/16; 350/359; 219/121 LQ; 219/121 LA
[58] Field of Search ............ 372/103, 19, 18, 15, 372/24, 16; 350/359, 487; 219/121 LP, 121 LQ, 121 LR, 121 LU, 121 LA

[56] References Cited

U.S. PATENT DOCUMENTS

| 3,292,102 | 12/1966 | Byrne .................. 219/121 LP |
| 3,500,240 | 3/1970 | Kessler .................. 331/94.5 |
| 3,699,474 | 10/1972 | Landry .................. 372/103 |
| 3,808,552 | 4/1974 | Baves .................. 372/103 |
| 3,940,712 | 2/1976 | White .................. 331/94.5 |
| 4,032,861 | 6/1977 | Rothrock .................. 372/103 |
| 4,323,317 | 4/1982 | Hasegawa .................. 219/121 LP |
| 4,430,548 | 2/1984 | Macken .................. 219/121 LP |
| 4,494,235 | 1/1985 | Guch, Jr. et al. .................. 372/19 |

FOREIGN PATENT DOCUMENTS

| 0674294 | 4/1939 | Fed. Rep. of Germany ...... 350/359 |
| 7800438 | 1/1977 | France . |
| 0068499 | 6/1978 | Japan .................. 219/121 LP |
| 0160091 | 4/1979 | Netherlands .................. 350/487 |
| WO81/02953 | 10/1981 | PCT Int'l Appl. . |

Primary Examiner—M. H. Paschall
Attorney, Agent, or Firm—Burns, Doane, Swecker & Mathis

[57] ABSTRACT

In the resonator of a laser generator, variable mode selective structure is provided to permit electrically actuated adaptation of beam parameters to required operating conditions. Such structure can be implemented with one or more pivotal plates, each having a different aperture, that are selectively pivoted into the beam path to effectively provide a variable mode diaphragm. In another embodiment, a spatial light modulator comprising a reversing prism with a variable position concave plate positioned adjacent its reflection surface and operating according to the optical tunnel effect can be used to selectively vary the effective diameter of the laser beam.

12 Claims, 7 Drawing Figures

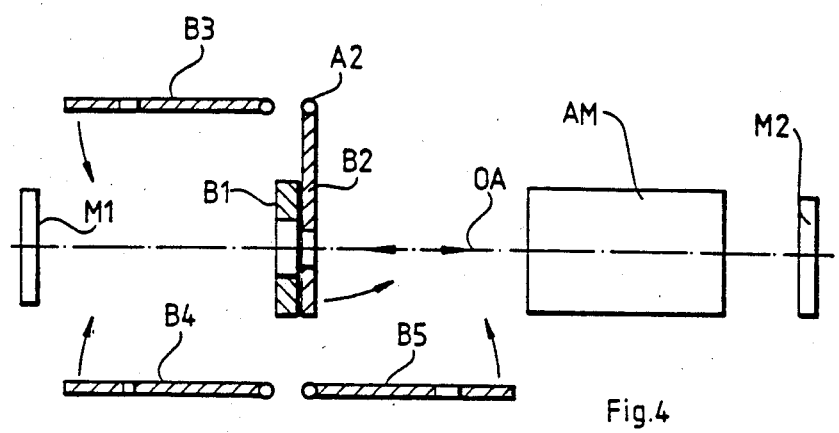
Fig. 4
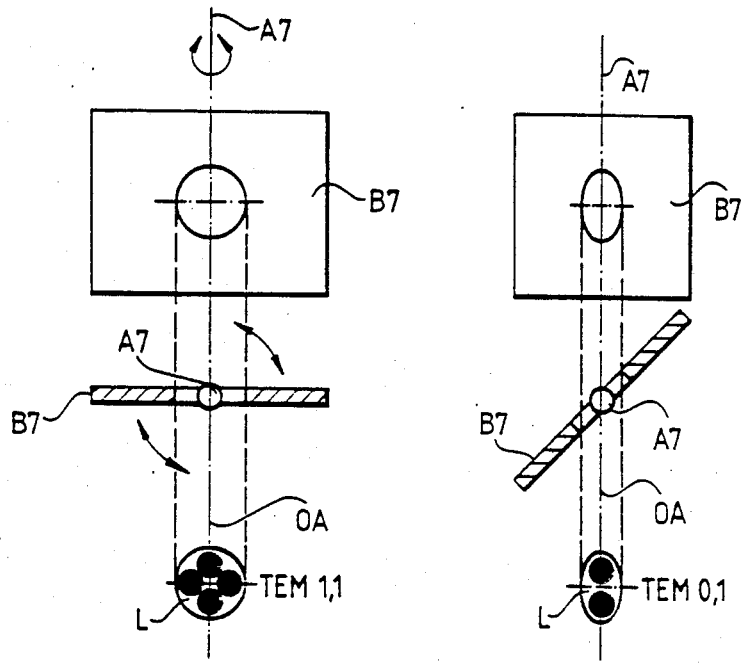
Fig. 5a
Fig. 5b

_(4,675,500)_

LASER PROCESSING APPARATUS WITH MEANS FOR SELECTIVELY VARYING THE TRANSVERSE MODE DISTRIBUTION OF THE LASER BEAM

BACKGROUND OF THE INVENTION

The present invention relates to an apparatus for the processing of a workpiece by means of a laser beam.

In the course of processing a workpiece by means of a laser the problem often arises that for certain operations (labelling, trimming, etc.) a high intensity beam is required, while for others (for example soldering, etc.) a high power beam is required. Usually therefore, different lasers with the most favorable configuration are used, or an existing installation is manually reset. For the optimum adaptation of the beam parameters (for example the diameter of the beam on the workpiece and the power), it is generally necessary to install replace or reset optical components both inside the laser resonator (mode diaphragms, lenses) and outside the resonator (for example beam expanders, lenses, diaphragms, filters).

If, however, different types of operations for which different beam parameters are required are to be performed on the same workpiece, resetting requires too much time in many cases. Furthermore, resetting by hand is cumbersome and often dangerous due to laser radiation, electric voltages and the like.

OBJECTS AND BRIEF STATEMENT OF THE INVENTION

It is an object of the present invention to remedy this situation and to improve a laser processing apparatus by providing remotely controlled resetting of the laser system for different cases of application. In this context, it is a particular object of the invention to simplify variation of the transverse mode distribution, i.e. cross-sectional area, of the beam.

Briefly, these objects are achieved in accordance with the invention by providing servocontrolled mode selective means in the laser resonator for adjusting the transverse distribution, i.e. crosssectional area or shape, of the laser beam. More specifically, a laser apparatus according to the invention can be equipped with servocontrolled, adjustable diaphragm to modify the transverse mode distribution.

THE RELEVANT PRIOR ART

An outwardly similar, but in its object definition and function entirely different, adjustable diaphragm is used in a gas laser described in U.S. Pat. No. 3,689,293. This diaphragm has the function of tuning the frequency of a gas laser that oscillates exclusively and fundamentally in the lowest transverse mode. The problem of variation of transverse mode distribution does not arise with this laser.

In U.S. Pat. No. 3,940,712 a special modulator for a laser generator is described, whereby the frequency or the phase of the laser oscillations may be varied. The modulator consists of a totally reflecting prism inserted in the laser resonator. A mirror is arranged parallel and spaced from the base surface of the prism, with the distance between the mirror and the base surface being adjustable by piezoelectric means. This modulator affects the effective resonator length and thus the frequency and phase position of the laser oscillations. It is, however, not suitable for the variation of mode distribution, in particular transverse modes.

In published PCT Application No. WO 81/029530, a wave guide laser aligned with a reversing prism for the bending of the beam path is described. In one of the short surfaces of the reversing prism a further prism is arranged parallel and spaced therefrom by a variable distance. By varying this distance, the quality of the laser oscillation may be affected, but the apparatus is not suitable for mode variation.

BRIEF DESCRIPTION OF THE DRAWINGS

Further features and advantages of the invention will become apparent from the following description of the illustrated embodiment. In the drawing:

FIGS. 4 to 7 are schematic diagrams of further embodiments of the invention.

DETAILED DESCRIPTION OF THE ILLUSTRATED EMBODIMENTS

Figure 1:
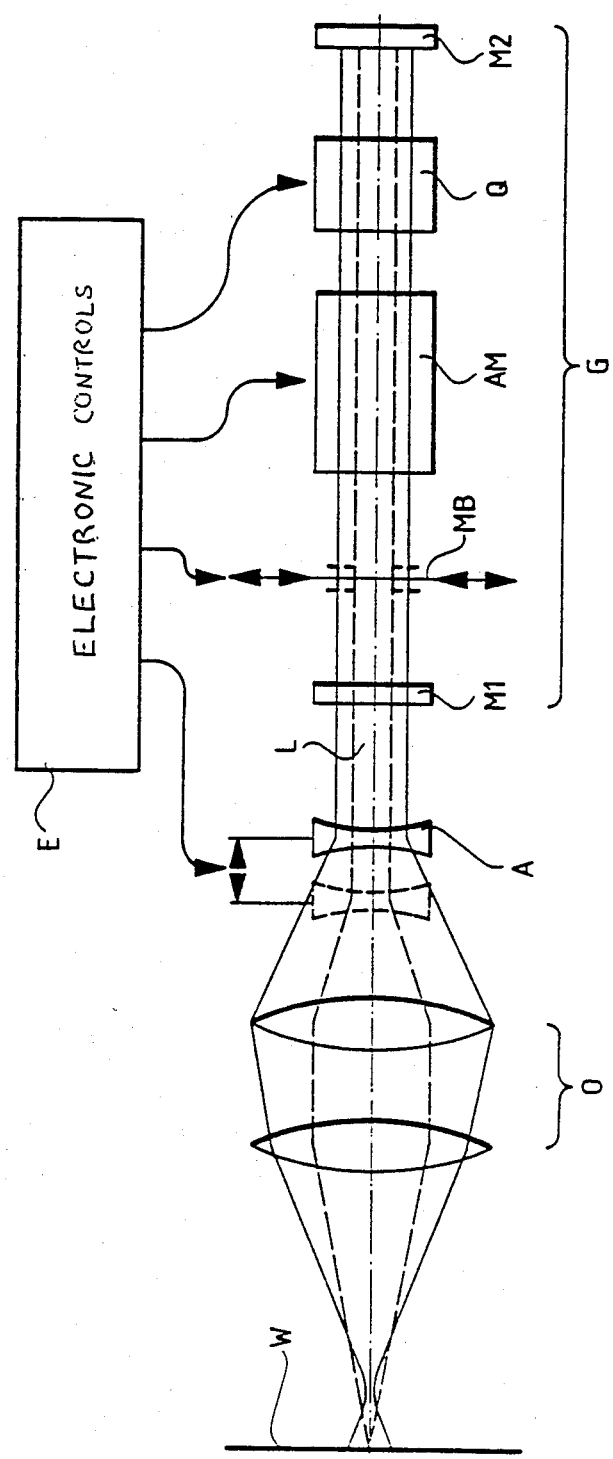
FIG. 1 is a schematic overall diagram of an embodiment of a laser processing apparatus according to the invention.

The most essential components of a laser processing apparatus are shown in FIG. 1. These components comprise a laser generator G to produce a laser beam L, an optical assembly O to focus the laser beam onto a workpiece W, a beam expander A and electronic controls E for regulating the generator G and the beam expander A. The laser generator G consists of a resonator defined by two mirrors $M_1$ and $M_2$, an active medium AM, a quality switch Q and a mode diaphragm MB.

To this extent the illustrated apparatus corresponds to the state of the art and requires no further explanation. In contrast to a known installation of this type, according to the invention the mode diaphragm MB and the beam expander A are not mounted or set fixedly in the apparatus. Rather, they are variable with the aid of servo means indicated by arrows to provide adjustable effects. In this manner the beam parameters may be adapted simply and rapidly to the most varied operating requirements.

Figure 2A:
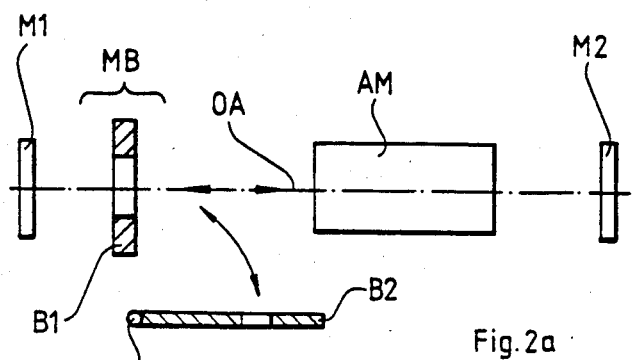
FIGS. 2a and 2b are schematic diagrams of one type of diaphragm in two different operating positions.
Figure 2B:
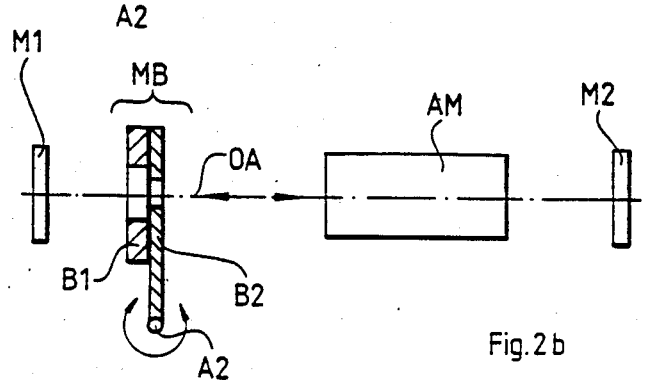

A schematic example of an adjustable mode diaphragm MB is shown in FIGS. 2a and 2b. As shown in the figures, the mode diaphragm MB consists of a stationary diaphragm part $B_1$ permanently located in the beam path and a moving diaphragm part $B_2$, which is capable of being pivoted into the beam path. The axis of rotation $A_2$ of the moving diaphragm part $B_2$ is perpendicular to the optical axis OA of the system and is parallel to or located in the plane of the moving diaphragm part $B_2$. The diaphragm part $B_2$ has a smaller aperture than the part $B_1$. Thus, when the moving part is pivoted away from the stationary part, as shown in FIG. 2a, a beam with a relatively large cross-section is provided, and when it is pivoted into the position shown in FIG. 2b, a smaller diameter beam is produced.

Figure 3:
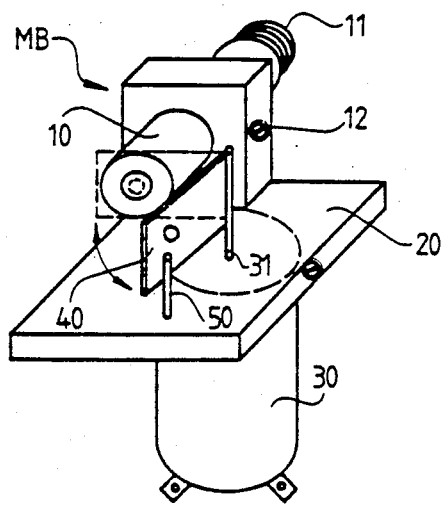
FIG. 3 is a perspective diagram of a particular embodiment of the diaphragm of FIGS. 2a and 2b.

FIG. 3 shows a practical embodiment of a variable mode diaphragm MB. The stationary diaphragm part has a conventional configuration of a tube 10 with a threaded fitting 11, which is screwed into an adjustable holder (not shown). A mounting platform 20 is fastened to the tube 10 and secured with stud screws 12. A d.c. motor 30 is mounted on the platform 20, and its shaft 31 carries a plate 40, which forms the moving diaphragm part B$_2$. A stop pin 50 limits the pivoting motion of the plate 40 away from the tube 10. By supplying electric voltage to the electric motor 30 of one or the other polarity, the plate 40 may be pivoted into the beam path in front of the tube 10, or out of it. With an appropriately chosen motor, this operation may be effected very simply by means of TTL signals, for example, provided by the electronic controls E in response to an operator input indicating one desired mode or the other.

The particular advantages of a variable mode diaphragm MB of the type shown in FIG. 3 include:

direct replacement of the usual stationary diaphrams without changing existing conventional holding means and while retaining adjusting possibilities, accurate positioning without mechanical stops which could be subject to wear in use, diversion of the power loss from the thin diaphragm plate to the massive stationary diaphragm screwed onto the mounting platform, compact, simple configuration, and smooth, non-jarring operation by the use of a d.c. motor, whereby the motion/acceleration characteristic of the plate 40 may be simply selected by appropriate electric actuation of the motor.

As schematically shown in FIG. 4, it is within the scope of the invention to employ several moving diaphragm parts B$_2$, B$_3$, B$_4$, B$_5$, to thereby obtain a greater number of different diaphragm settings.

In place of individual diaphragms, a revolving diaphragm (e.g. wheel with different diaphragms) or continuously variable diaphragms (e.g. iris diaphragms) may be used. In view of the highly critical stability and precision of the diaphragm position, such configurations can be expensive however. Furthermore, it is more diffficult to find a solution for the cooling problem in the case of high capacity lasers.

A further possibility for selecting different transverse modes of the laser are shown in FIGS. 5a and 5b. Here, a diaphragm B$_7$ is rotated around a pivoting axis A$_7$ located in its plane and intersecting the optical axis OA of the system, to thereby vary the effective beam cross section. In the position shown in FIG. 5a, for example the laser beam has a TEM$_{1,1}$ mode, and in the position of FIG. 5b a beam with a TEM$_{0,1}$ mode is obtained.

Figure 6:
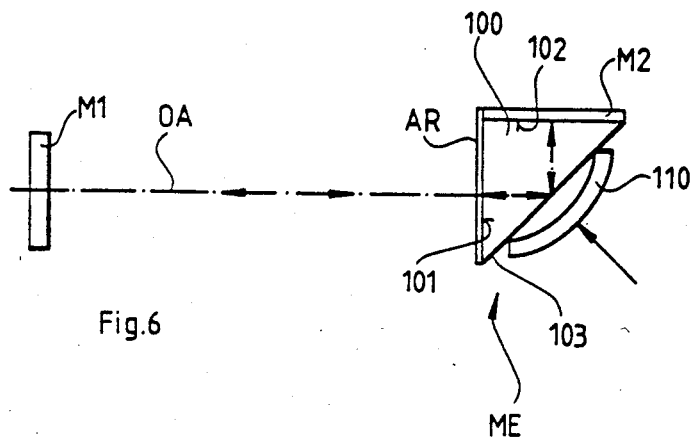
Figure 7:
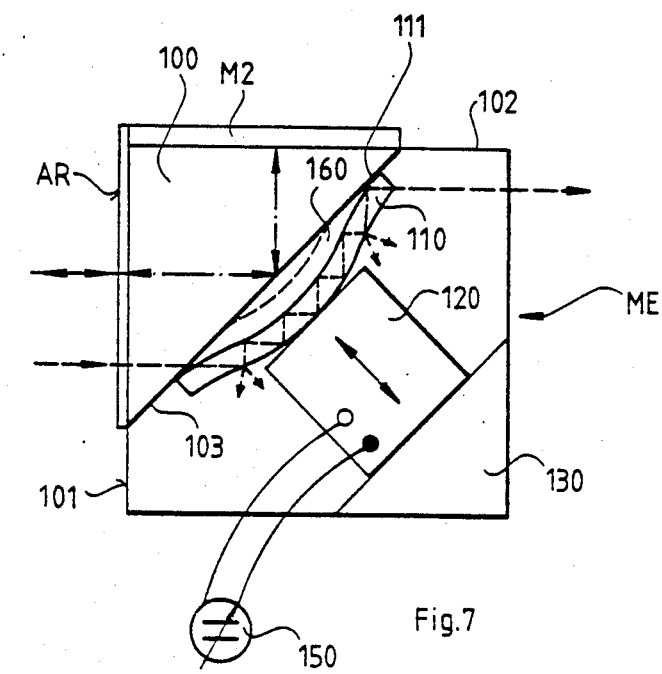

In certain cases the variation of the beam must be effected rapidly, continuously and if possible, without extensive mechanical movements. These requirements can be met with the embodiment shown in FIGS. 6 and 7, wherein the variable mode diaphragm MB is replaced in the resonator by a spatial light modulator (SLM) ME utilizing the so-called optical tunnel effect.

This modulator element ME consists essentially of a totally reflecting reversing prism 100, one lateral surface 101 of which is aligned perpendicularly to the optical axis OA of the laser resonator and the other lateral surface 102 is parallel thereto. The perpendicular lateral surface 101 is provided with an antireflective coating AR, and the parallel lateral surface 102 carries the resonator mirror M2.

On the base surface 103 of the reversing prism 100 a concave plate 110 is provided. This plate is transparent to laser radiation and is made of an elastic, slightly deformable material (for example glass). This plate 110 is pressed against the base surface 103 of the prism 100 by means of a piezoelectric adjusting element 120, supported by a counter-bearing 130, so that it rests along its edge 111 on the base surface 103. The piezoelectric adjusting element 120 is connected with a variable power source 150, represented in actual practice by the electronic control device E. Depending on the voltage applied, the piezoelectric adjusting element 120 presses the plate 110 with a greater or lesser force against the reversing prism 100. In the process, the air gap 160 between the concave side of the plate 110 and the base surface 103 is varied, thereby modulating the mode distribution of the laser beam.

The modulator element ME operates on the principle of frustrated total reflection, also called the optical tunnel effect. If a prism were present in place of the plate, the laser beam would be reflected totally from its base surface. For electrodynamic reasons, the "transverse damped wave" generated on the base surface cannot be radiated into the optically thinner material. If, however, the plate 110 is moved closer to the base surface, the surface wave is affected and is able to radiate part of its energy into the plate. As a result, the incident wave is no longer reflected totally, but only partially, as a function of the distance of the plate. It is thus possible to modulate the wave by varying the distance of the plate.

The plate 110 used in the invention is not flat, but concave, so that the air gap varies as a function of its location. In the center area of the prism base surface, where the distance to the plate 110 is relatively large, the reflectivity is high enough for a laser emission to take place. This area corresponds to the free aperture of a conventional mode diaphragm. The modulator element ME thus corresponds to an electrically continuously adjustable diaphragm for the mode selection of a laser.

The form of the effective "aperture" of this mode selector may be varied, for example by the shape of the plate through the configuration of the mechanical transition between the piezoelectric element and the reverse side of the plate, by the configuration of the prism or by means of additional elements in the laser resonator (for example cylindrical lenses). It should be understood further that the plate need not necessarily be in direct contact with the base surface of the prism, but in an appropriate configuration may be arranged spaced apart at a certain distance.

For a further adaptation to the type of processing to be performed with the apparatus, the laser beam L may be tansformed outside the resonator by means of adaptive optical elements, preferably combined with the manipulations of the beam inside the resonator. Examples of such adaptive optical elements are mechanically displaceable components (lenses, mirrors, gratings, prisms, holograms, diaphragms) and electrically controllable optical elements (liquid crystal cells, deformable mirrors and other elements, optical space and time modulators, attenuators, etc.) In FIG. 1, a Gauss beam expander A is illustrated as a representation of all of the aforementioned possibilities. The essential factor for the optimum adaptation of the beam parameter is, however, in all cases that the corresponding manipulations take place inside the resonator. Variations of only the optical components outside the resonator usually do not lead to satisfactory results. The above described invention therefore provides variable mode selective means in the resonator, thereby making possible the servo-controlled adaptation of the beam parameters (mode structure, divergence, beam diameter, power) to a given operational case by means of a computer.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Apparatus for the processing of a workpiece by means of a laser beam, comprising:
   a laser generator having a resonator for the production of a laser beam;
   an optical assembly for focusing the laser beam on the workpiece;
   an optical component located outside the resonator for modifying the beam parameters;
   servo-controlled mode selective means located in said resonator for varying the transverse mode distribution of the laser beam while maintaining the wavelength of the laser beam;
   electric control means for adjusting said servo-controlled mode selective means to vary said transverse distribution.

2. Apparatus according to claim 1, wherein said optical components located outside the resonator are also variable by means of servo-controls.

3. Apparatus according to claim 1 wherein said mode selective means comprises a diaphragm that is pivotable into the path of the laser beam around a pivot axis parallel to said diaphragm.

4. Apparatus according to claim 1 wherein said mode selective means comprises a stationary diaphragm and at least one movable diaphragm that is pivotable into the beam path around a pivot axis parallel to said movable diaphragm.

5. Apparatus according to claim 1 wherein said mode selective means comprises a diaphragm that is pivotable around an axis which intersects the axis of the laser beam.

6. Apparatus according to claim 3, wherein said pivotable diaphragm is driven by a d.c. electric motor.

7. Apparatus according to claim 4 wherein said pivotable diaphragm is driven by a d.c. electric motor.

8. Apparatus according to claim 5, wherein said pivotable diaphragm is driven by a d.c. electric motor.

9. Apparatus for the processing of a workpiece by means of a laser beam, comprising:
   a laser generator having a resonator for the production of a laser beam;
   an optical assembly for focusing the laser beam on the workpiece;
   an optical component located outside the resonator for modifying the beam parameters;
   servo-controlled mode selective means located in said resonator for varying the transverse mode distribution of the laser beam, wherein said mode selective means comprises an electrically variable element within said resonator that operates according to the principle of the optical tunnel effect; and
   electric control means for adjusting said servo-controlled mode selective means to vary said transverse distribution.

10. Apparatus according to claim 9 wherein said electrically variable element comprises a totally reflecting reversing prism having a mirror for the resonator located on one lateral side thereof and a concave, elastically deformable transparent plate arranged on its base surface, and electrically controlled adjusting means for pressing the plate against the base surface with a variable force.

11. Apparatus according to claim 10 wherein said adjusting means comprises a piezoelectric adjusting element.

12. The apparatus of claim 10 wherein laser light which traverses from said base surface of said prism into said transparent plate is conducted away from said prism and not reflected back into the prism.

* * * * *